March 24, 1964 P. H. COLLIN ETAL 3,126,085
CONVEYING DEVICE
Filed Sept. 11, 1961 2 Sheets-Sheet 2

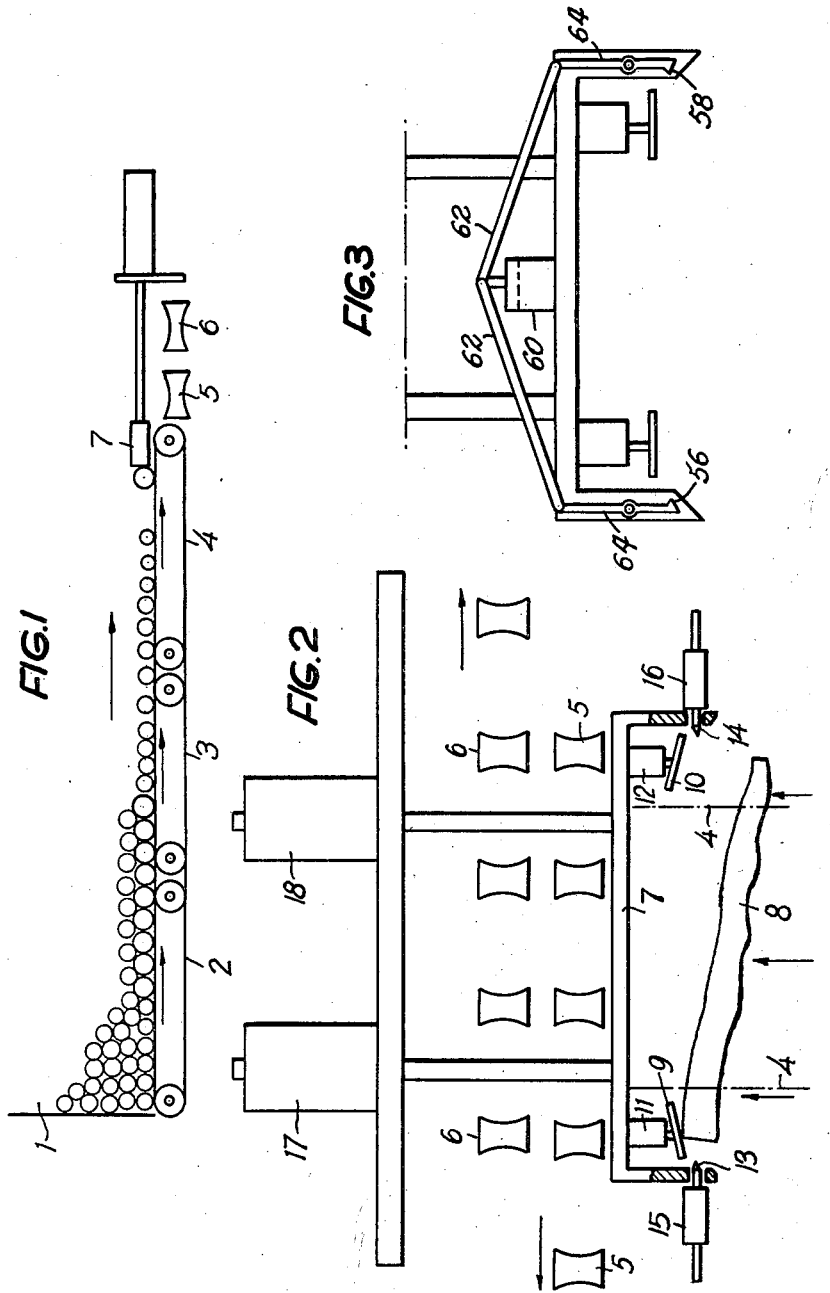

INVENTORS
Per Harold Collin
Georg Jansson
BY
Cushman, Darby & Cushman
Attorneys

3,126,085
CONVEYING DEVICE

Per Harald Collin, Herrgarden, Skutskar, and Georg Jansson, Gavle, Sweden, assignors to Stora Kopparbergs Bergslags AB, Falun, Sweden, a corporation of Sweden
Filed Sept. 11, 1961, Ser. No. 137,242
Claims priority, application Sweden Sept. 23, 1960
4 Claims. (Cl. 198—20)

This invention relates to a device for transferring long-shaped objects from a conveyor to another conveyor. In many technical fields it is required to pick up long-shaped objects, such as logs, from a stock one at a time and to advance them in succession end to end. If these long-shaped objects are straight and of equal diameters, this operation does not involve much trouble, and this problem has been solved in various manners by automatically operating devices. However, if the long-shaped or rod-like objects are of varying thicknesses as well as crooked, considerable difficulties have to be overcome. This is the case for instance in the woodworking industry where it is desired to transfer logs from a stock one by one to a working machine. Hitherto, manual control has been necessary to prevent these logs from assuming oblique positions or arriving in pairs, for instance in sawmills. In other cases, for instance in chip-cutting machines in cellulose works, it is not of importance if a stout log is followed by two slender logs arriving side by side. However, in some cases it would be a considerable improvement if the logs could be advanced one by one in succession without the necessity of manual control, for instance if the logs are to be fed into barking machines of the type in which one log is barked at a time.

The object of the invention is to provide a device for feeding logs or other long-shaped or rod-like objects one at a time to a working machine irrespective of the diameters or crookedness of the objects. This object is attained by mechanism described hereinbelow with reference to the accompanying drawing.

Figure 4:
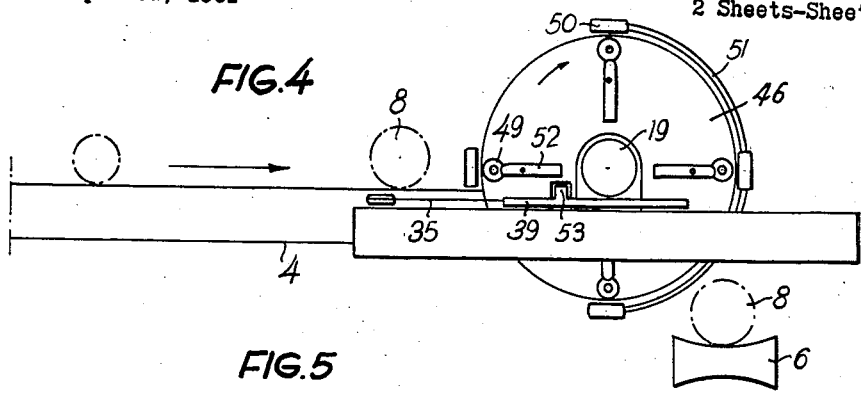

FIG. 1 is a general side elevation of a device according to the invention. FIG. 2 is an enlarged top view illustrating a gripping device for transferring logs from one conveyor to another conveyor. FIG. 3 illustrates a modification of the device shown in FIG. 2. FIG. 4 is a lateral view of another embodiment of the invention and FIG. 5 a corresponding top view. FIG. 6 illustrates a detail of the mechanical contact device of FIG. 5.

To begin with, the logs are piled in a stack 1 from which they are removed by means of a series of aligned conveyor chains 2–4. From the chains 2 the logs are moved to the chains 3 which run at a higher speed and then to the chains 4 which run at a still higher speed, resulting in an increase of the distances between the logs which are spread to form a single layer. A conveyor of this type is generally used for supplying chip-cutting machines or the like with logs, the arrangement being such that a second conveyor for moving the long-shaped objects longitudinally of themselves is provided at the discharge end of the conveyor for moving the objects transversely of themselves. The conveyor for moving the objects longitudinally of themselves must run at so high a speed that a log gets out of the way before the next log drops onto this conveyor. Since the spacing of the logs on the conveyor for moving the logs in a transverse direction is entirely at random and since the logs may be placed obliquely on this conveyor, such a conveying device is not able to work satisfactorily without manual control.

In accordance with the invention there is provided, at the discharge end of the conveyor 2–4, a gripping device 7 which grips the logs one at a time and transfers them successively to a conveyor 6 which moves the logs longitudinally of themselves. FIG. 2 illustrates the mode of operation of an embodiment of the gripping device. The first conveyor 2–4 which may be called a parallel conveyor moves a log 8 toward the gripping device. If, as shown, the log 8 is placed obliquely on this conveyor, one end of the log will first come into contact with an abutment 9 which stops this end of the log. As a result, the log will be turned until its other end comes into contact with a second abutment 10. The abutments act upon feelers 11 and 12 which when actuated simultaneously release claws 13 and 14 which then move toward each other so as to grip the log endwise. Thereupon the entire gripping device 7 is moved back (toward the top of the page as viewed in FIGURE 2) to the position where the log is right above the conveyor 6 whereupon the claws 13 and 14 return to their initial positions and the log drops onto the conveyor 6. The distance between the abutments and the gripping claws is such that if two logs simultaneously arrive at the gripping device only the foremost one will be gripped. While the gripping device moves this foremost log to the conveyor 6 the second log is moved by the conveyor 4 to a return conveyor 5 onto which it is dropped and by means of which it is moved back to the stock 1. The speed of the parallel conveyor 2–4 is adjusted such that the amount of logs conveyed thereby substantially corresponds to the capacity of the gripping device. A condition for the proper function of the conveying device is that the logs are of substantially equal lengths. However, the gripping device may be constructed such as to be adjustable for different lengths.

The invention is not limited to the described construction of the conveyor 2–4 and the second conveyor 6 which may be called a longitudinal conveyor, and also the gripping device may be constructed in different ways. The device illustrated in FIG. 2 is adapted to be operated pneumatically, the abutments being adapted to actuate air valves in the feelers 11 and 12 which control piston devices at 15 and 16 for the gripping claws and at 17 and 18 for the operation of the gripping device 7. Conduits and further valves required for the automatical function of the transferring device are not shown in the drawing. Instead, the device may be operated electrically or mechanically, and the general arrangement may be varied within the scope of the invention. FIG. 3 illustrates a modified construction for the operation of the gripping claws. In this embodiment the claws 56 and 58 are operated by a single piston device 60 by means of pivoted lengths 62 and 64. Also the suspension of the gripping device may be modified within the scope of the invention.

In FIGS. 2 and 3 the gripping claws are pointed so as to penetrate into the ends of the logs. Instead thereof they may be blunt or fluted or coated with some friction material so as not to damage the rod-like objects.

Referring to FIG. 4, the logs 8 are moved by a parallel conveyor 4 toward a plurality of gripping members pairwise arranged around a shaft 19 which by a driving device not shown is rotated at a constant speed. If a pair of gripping members is passing at the end of the conveyor and a log simultaneously is in a proper position on the conveyor, the gripping members are started and take hold of the log endwise, move the log half a revolution clockwise as viewed in FIGURE 4 and then let the log drop onto the longitudinal conveyor 6.

Figure 5:
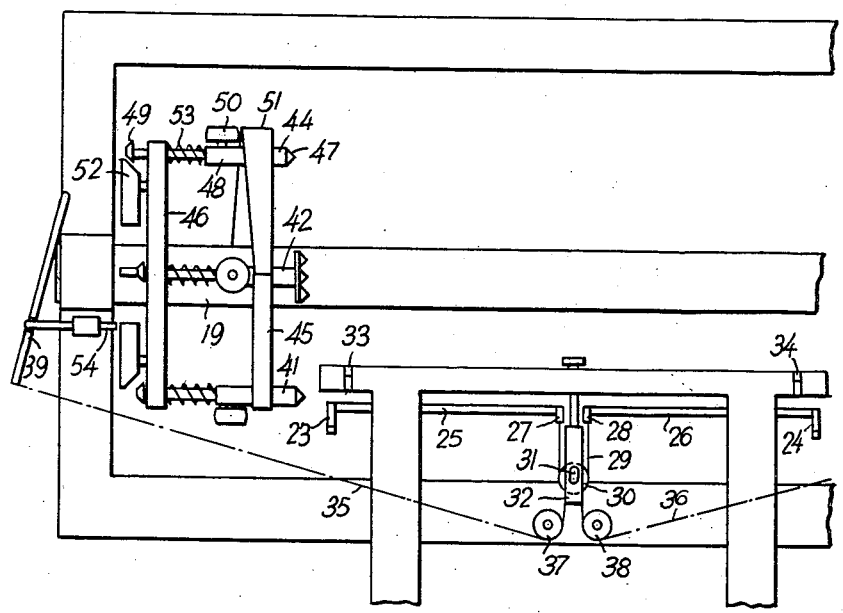
Figure 6:
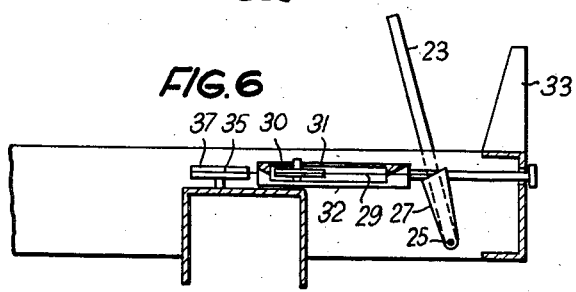

FIG. 5 is a top view illustrating the function of the gripping members at one end of the gripping device. A plurality of gripping members 41–44 are mounted around the shaft 19 in discs 45, 46 and follow the rotation of the shaft. Each of the gripping members 41–44 corresponds to a similar gripping member at the opposite end, not shown, of the gripping device. The gripping members are in the form of plates or points 47 which are suitably fluted or pointed to secure a firm hold on the ends of the logs and have each a stem 48 which carries a roller 50 which during one half of each revolution of the plates 45, 46 travels on a stationary cam 51. Thereby the gripping member stem 48 is moved back (to the left as viewed in FIGURE 5) so that the plate or point 47 is disengaged from the log and a helical spring 53 is compressed between the stem 48 and the disk 46. The rear end of the stem has a head 49 which is engaged by a catch 52 when the spring is compressed. When the gripping member passes the end of a log which has assumed the proper position to be gripped (as described hereinafter), the catch 52 is disengaged by a trip pin 54. The same action occurs simultaneously at the corresponding gripping member at the other end of the gripping device, both gripping members being pushed forward simultaneously to grip the log between themselves. Instead of the spring 53, pneumatically, hydraulically or electrically operated means may be used for moving the gripping members. FIGS. 5 and 6 illustrate a mechanically operating releasing device the mode of operation of which is as follows.

By means of the parallel conveyor 4 the logs 8 are moved toward two feelers 23, 24 in the form of fingers which are secured to a shaft 25 and 26, respectively. The inner ends of these shafts are provided with corresponding fingers 27, 28 which are connected to a rope 29 running over a pulley 30 which is displaceably mounted in an oblong hole 31 in a pull rod 32. If one end of a log is urged against the finger 23, for example, the shaft 25 and the finger 27 will be turned, resulting in that the rope 29 is stretched and pulls the pulley 30 forward (in the direction of movement of the log) along the oblong hole 31. When the shaft of the pulley reaches the forward end of the oblong hole, the above-named end of the log has been stopped by a fixed abutment 33 and nothing will happen until the other end of the log arrives at the other finger 24, thereby also stretching the other end of the rope 29. Since the pulley 30 cannot move further in the oblong hole 31, it will pull the rod 32 forward. As a result thereof, the rod 32 actuates the trip pins 54 and 55 by means of two ropes 35 and 36 running over stationary leading pulleys 37 and 38 and by means of two levers 39 and 40. The trip pins 54 and 55 then release that pair of gripping members which is moving nearest the gripping position. (The lever 40 and the trip pin 55 are provided at the end of the gripping device not shown in the drawing.) Thereupon the various parts are returned by suitably placed helical springs, not shown.

It will be obvious that the mechanical contact device illustrated may be replaced by suitable electrically, pneumatically or hydraulically operated devices, but due to its simple construction the mechanical device illustrated is believed to be preferable for the reason of reliability in service and low manufacturing cost.

It will be understood that the device according to the invention may be used in other technical fields where the same problem arises, and that the invention is not limited to the above described conveying and transferring of logs and may equally well be applied to other long-shaped objects.

What is claimed is:
1. A conveying device for long-shaped objects of substantially equal lengths, comprising a first conveyor for moving the objects transversely of themselves and having a discharge end, a second conveyor located at the discharge of the first conveyor for moving the long-shaped objects longitudinally of themselves one by one in succession end to end, and a movable gripping device at the discharge end of said first conveyor for gripping the objects endwise one at a time at both ends and for transferring the objects to the second conveyor to be moved longitudinally thereby, said gripping device including spaced adjustable gripping members and two spaced contact sensitive members and means responsive to actuation of both of said contact sensitive members by the ends of a long-shaped object to move said gripping members into engagement with the ends of the long-shaped object.

2. A conveying device as set forth in claim 1 wherein said contact sensitive members are located at opposite ends of said gripping device and wherein each of said members includes an abutment member arranged such that a long-shaped object being moved obliquely toward the gripping members by said first conveyor is turned and actuates the gripping device only after both ends of the object simultaneously are in contact with said abutment members, the gripping device being adapted to hold the object while transferring it to said second conveyor.

3. A conveying device as set forth in claim 1 wherein said gripping device includes a horizontal rotatable shaft and means mounting said gripping members on said shaft for rotation therewith, said gripping members being adapted, when passing at the discharge end of the first conveyor, to grip a long-shaped object endwise and to transfer the object to said second conveyor to be moved longitudinally thereby.

4. A conveying device for long-shaped objects of substantially equal lengths comprising: a first conveyor for moving the objects transversely of themselves and having a discharge end; a second conveyor for moving the objects longitudinally of themselves one by one in succession end to end; and means located at the discharge end of said first conveyor for aligning each object, as it arrives at said discharge end into parallel relationship with the direction of travel of said second conveyor; and means actuated by said aligning means for gripping each aligned object endwise one at a time at both ends and for transferring each aligned object one at a time to said second conveyor to be moved longitudinally thereby.

References Cited in the file of this patent
UNITED STATES PATENTS

| | | |
|---|---|---|
| 1,638,310 | Killebrew | Aug. 9, 1927 |
| 1,686,174 | Rauschenberger | Oct. 2, 1928 |
| 2,432,024 | Lipton | Dec. 2, 1947 |